United States Patent [19]

Tateno et al.

[11] Patent Number: 4,846,419
[45] Date of Patent: Jul. 11, 1989

[54] CASSETTE REEL HAVING AN INDICATOR FOR TAPE VOLUME WITH AN UPPER FLANGE

[75] Inventors: Shigeru Tateno, Tochigi; Kazuo Ozawa, Miyagi, both of Japan

[73] Assignee: Sony Corporation, Tokyo, Japan

[21] Appl. No.: 151,971

[22] Filed: Feb. 3, 1988

[30] Foreign Application Priority Data

Feb. 27, 1987 [JP] Japan .................................. 62-28564

[51] Int. Cl.⁴ .................... B65H 75/14; G11B 23/037
[52] U.S. Cl. .................................................. 242/71.8
[58] Field of Search ................ D14/10, 11; 242/71.8, 242/77, 118, 118.4

[56] References Cited

U.S. PATENT DOCUMENTS 4,184,650 1/1980 Nelson et al. ...................... 242/71.8

Primary Examiner—David Werner
Attorney, Agent, or Firm—Philip M. Shaw, Jr.

[57] ABSTRACT

A cassette reel for use with a video cassette having an upper flange formed of a transparent plate and a plurality of indicators for a tape volume, each of the indicators being formed of a plurality of crimped portions provided on the outer surface of the upper flange in the diametrical direction thereof, wherein the innermost crimped portions of the plurality of indicators are made higher than other crimped portions, so that when the cassette reels are stacked up and transported for the assembly, the transparent portion of the cassette reel can be protected from being damaged and the commercial value of the cassette reel can be increased without being designed awkwardly.

5 Claims, 3 Drawing Sheets

CASSETTE REEL HAVING AN INDICATOR FOR TAPE VOLUME WITH AN UPPER FLANGE

BACKGROUND OF THE INVENTION

1. Field of the Invention

The present invention relates generally to a cassette reel suitable for use with, for example, a video cassette. More particularly, this invention relates to a cassette reel having an indicator for a tape volume on its upper flange.

2. Description of the Prior Art

So far there have been proposed various tape cassette reels for use with a video cassette. FIGS. 1 and 2 illustrate an example of the conventional tape cassette reel. FIG. 1 is a perspective view of the cassette reel and FIG. 2 is a cross-sectional view taken along a line II—II in FIG. 1.

Referring to FIGS. 1 and 2, there is shown a tape cassette reel 13 that comprises a hub 1 integrally molded with a lower flange 2 and an upper flange 3 fixed to the upper end face of the hub 1. The upper flange 3 is formed of a transparent plastic plate and has projections 5, . . . 5 protruded downwards from a stepped portion 4 of the lower surface thereof as shown in FIG. 2. Thus, when these projections 5, . . . 5 are welded on an upper end face 6 of the hub 1 by ultrasonic welding process, the upper flange 3 is fixed to the upper end face 6 of the hub 1. The upper flange 3 forms on its upper surface a concave portion 7 in correspondence with the hub 1. The shape of the concaved portion 7 is circular and the diameter thereof is slightly smaller than that of the hub 1. The circular concave portion 7 forms at its center an opening portion 8. A center pin 9, which forms a contact portion with a cassette reel pressing spring provided on a video cassette housing, is loosely held between the central lower surface of the upper flange 3 and the central upper end face of the hub 1. The hub 1 is provided on its lower surface with a hub drive shaft engaging opening 10 that is engaged with a hub drive shaft (not shown) provided on the main body of the video tape recorder. Also, the hub 1 is provided around its peripheral surface with a clamp piece engaging portion 11. This clamp piece engaging portion 11 serves to fix a tape end of a video tape in cooperation with a clamp piece (not shown). While, around its outer peripheral surface of the lower flange 2 there is formed a gear portion 12 that engages with a reel brake (not shown). Further, there are provided indicators 18 and 19 on the upper surface of the transparent flange 3 by which the user can check the tape volume. The indicator 18 is formed of a plurality of wrinkled or crimped portions, for example, five crimped portions 18a, 18b, 18c, 18d and 18e aligned in the diametrical direction of the upper flange 3. While, the indicator 19 is formed of five crimped portions 19a, 19b, 19c, 19d and 19e similarly arranged on the upper surface of the upper transparent flange 3.

FIG. 3 shows an example of a video cassette having the thus arranged cassette reels 13, 13 accommodated therein. In this embodiment, as shown in FIG. 3, this video cassette comprises a housing 14, and the housing 14 has on its upper surface a window 15 made of transparent plastics. Through this transparent window 15, the user can check the volume of a tape 16 that is extended between the cassette reels 13, 13. In other words, the transparent window 15 enable the user to check the consumed and/or remaining volume of the tape 16.

There are provided the above-mentioned cassette reel pressing springs 17, 17 which hold the cassette reels 13, 13, respectively.

Incidentally, a plurality of cassette reels 13 are usually stacked up and transported at the manufacturing stage when the cassette reels 13 are assembled into the video cassette. At that time, the lower flange 2 of another cassette reel 13 collides with the transparent upper flange 3 of one cassette reel 13 so that the transparent portion of the upper flange 3 of the latter cassette reel 13 is damaged by the lower flange 2 of the former cassette reel 13.

In order to protect the transparent portion of the upper flange of the cassette reel from being damaged when the cassette reels are stacked and transported for assembly, a cassette reel is proposed to have projections formed on the outer surface of the upper flange and protruded outwardly (see Japanese Laid-Open Utility Model Application No. 55-144681). In the thus proposed cassette reel having the projections formed on the outer surface of the upper flange, these projections are fully exposed to view through the transparent window of the video cassette. Also, these projections are designed awkwardly and the appearance of the video cassette is made unattractive, thus degrading the value of the video cassette as a product.

OBJECTS AND SUMMARY OF THE INVENTION

Accordingly, it is an object of this invention to provide an improved cassette reel.

Another object of the present invention is to provide a cassette reel in which a transparent portion of an upper flange of the cassette reel can be protected from being damaged even when the cassette reels are stacked up and transported for assembly.

A further object of the present invention is to provide a cassette reel that is very attractive from an industrial design standpoint.

A yet further object of the present invention is to provide a cassette reel that can increase the commercial value of the video cassette.

According to one aspect of the present invention, there is provide a cassette reel comprising:
  (a) a hub;
  (b) a lower flange integrally molded with said hub;
  (c) an upper flange formed of a transparent plate; and
  (d) a plurality of indicators for a tape volume, each of said indicators being formed of a plurality of crimped portions protruded upwardly on the outer surface of said upper flange in the diametrical direction thereof, wherein the innermost crimped portions of said indicators are made higher than other crimped portions.

These and other objects, features and advantages of the present invention will become apparent from the following description of illustrative embodiment thereof, to be taken in conjunction with the accompanying drawings, throughout which like reference numerals represent the same or similar parts.

DETAILED DESCRIPTION OF THE PREFERRED EMBODIMENT

Figure 4:
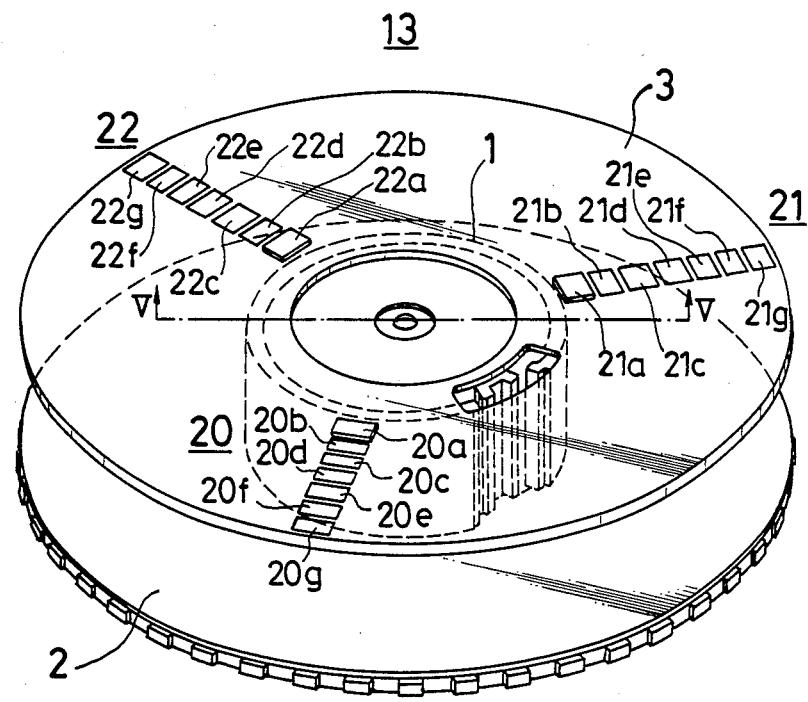
FIG. 4 is a perspective view illustrating an embodiment of a cassette reel according to the present invention.
Figure 5:
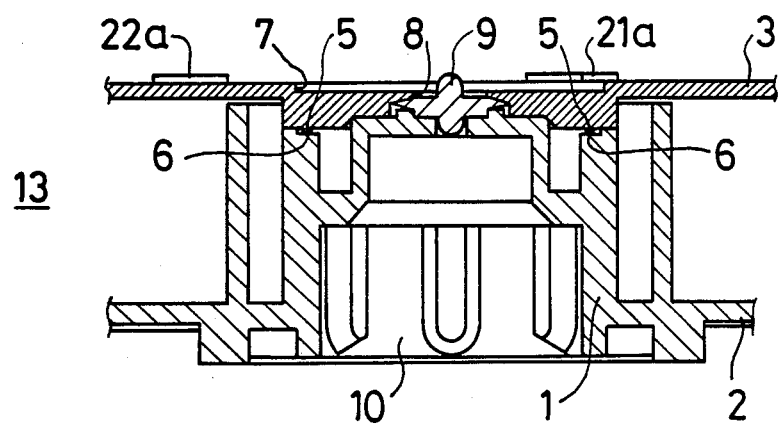
FIG. 5 is a cross-sectional side view taken along a line V—V in FIG. 4.
Figure 6:
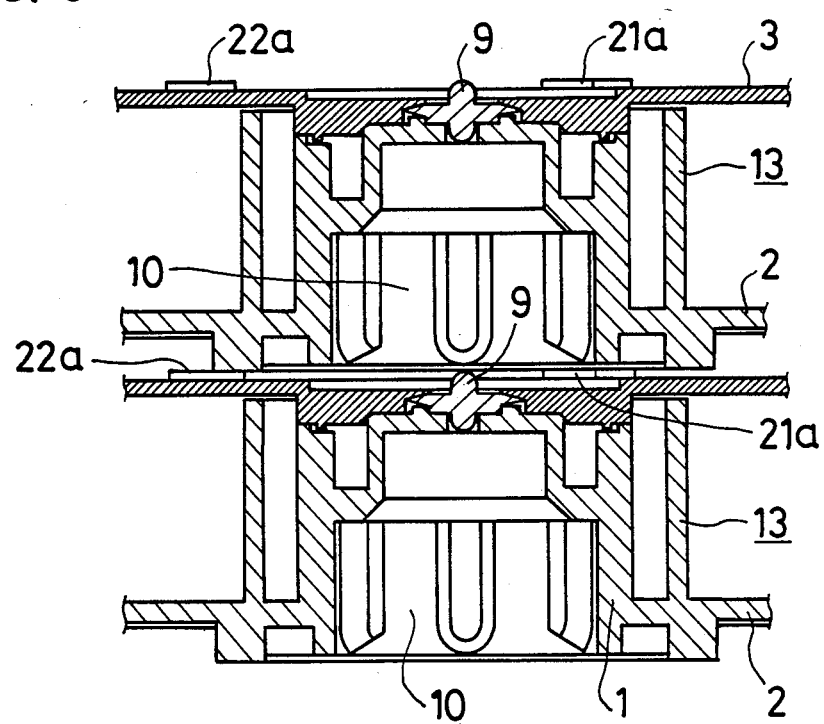
FIG. 6 is a cross-sectional view used to explain the state that the cassette reels of this invention are stacked up for its assembly.

Now, an embodiment of a cassette reel according to the present invention will hereinafter be described in detail with reference to FIGS. 4 to 6. In FIGS. 4 to 6, like parts corresponding to those of FIGS. 1 and 2 are marked with the same reference numerals and therefore need not be described in detail.

Figure 1:
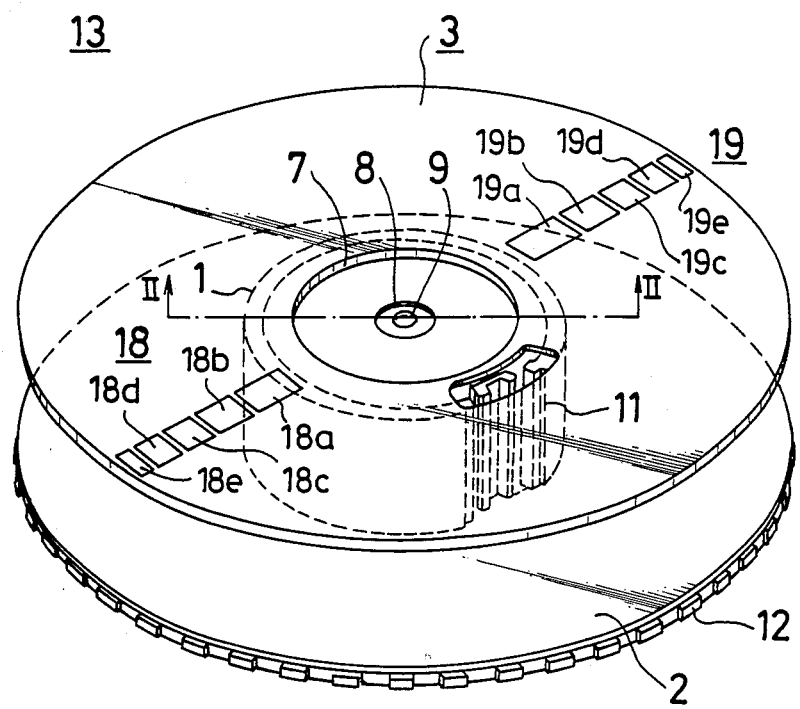
FIG. 1 is a perspective view illustrating an example of a conventional cassette reel.
Figure 2:
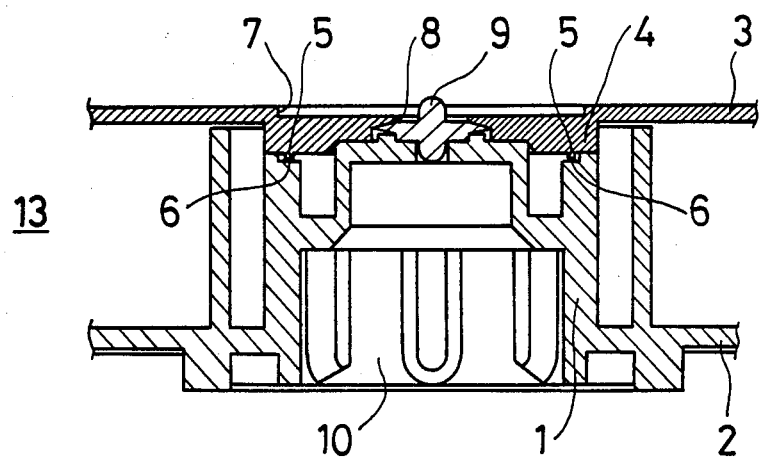
FIG. 2 is a cross-sectional side view taken along a line II—II in FIG. 1.

In this embodiment, as shown in FIGS. 4 and 5, the lower flange 2 is integrally molded with the hub 1 and the upper flange 3 made of a transparent plastic plate is fixed to the upper end face of the hub 1, similarly to FIGS. 1 and 2. In this case, the upper flange 3 is fixed to the upper end face 6 of the hub 1 by welding the projections 5, . . . 5 formed on the stepped portion 4 of the lower surface thereof by the ultrasonic welding process.

Figure 3:
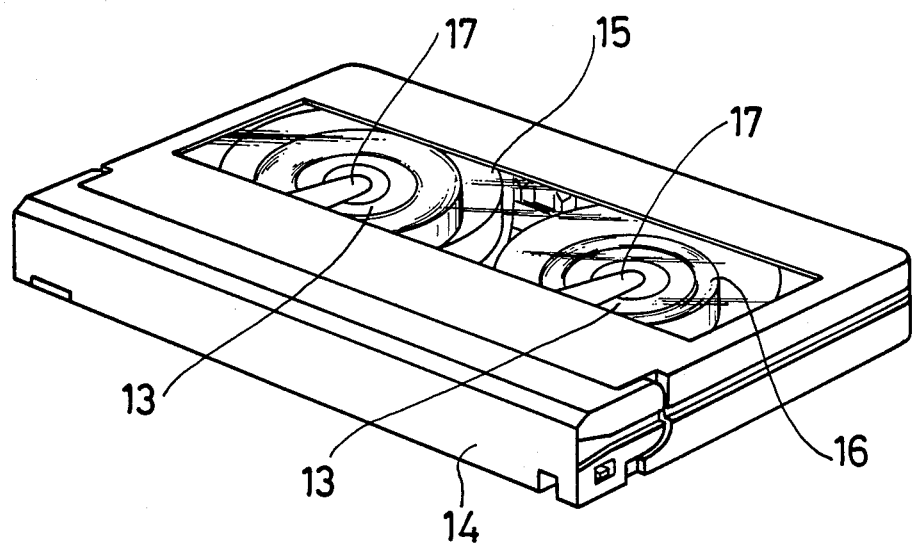
FIG. 3 is a perspective view illustrating an example of a video cassette.

According to this embodiment, on its outer surface of the transparent upper flange 3, there are formed three wrinkled or crimped indicators 20, 21 and 22 which are extended with an angular spacing of 120° between adjacent ones in the diametrical direction of the upper flange 3. These indicators 20, 21 and 22 are used to check the tape volume and are respectively formed of seven crimped portions 20a, 20b, . . . 20g; 21a, 21b, . . . 21g; and 22a, 22b, . . . 22g of the same predetermined shape aligned in the diametrical direction of the circular upper flange 3. In this embodiment, the innermost crimped portions 20a, 21a and 22a of three indicators 20, 21 and 22 are made to be higher than the transparent portion of the upper flange 3 by the height ranging of from 0.1 mm to 0.5 mm. While, other crimped portions 20b, 20c, . . . 20g; 21b, 21c, . . . 21g; and 22b, 22c, . . . 22g are made to be higher than the transparent portion of the upper flange 3 by substantially 20 micrometers similarly to the known crimped portions. Other portions of the cassette reel of this invention are formed the same as those of the conventional cassette reel shown in FIGS. 1 and 2. The cassette reels 13 of this invention are also assembled into the video cassette as shown in FIG. 3.

Since the innermost crimped portions 20a, 21a and 22a of three indicators 20, 21 and 22 are made higher than other crimped portions 20b, 20a, . . . 20g; 21b, 21c, . . . 21g; and 22b, 22c, . . . 22g as described above, upon the transportation of the cassette reels for assembly as shown in FIG. 6, a plurality of the cassette reels 13 can be stacked up without trouble. In other words, when these cassette reels 13 are stacked up, only the innermost crimped portions 20a, 21a and 22a of the indicators 20, 21 and 22 collide with the lower flange 2 of other cassette reel 13 and the transparent portion of the upper flange 3 is prohibited from contacting with the lower flange 2. Thus, the transparent portion of the upper flange 3 can be protected from being damaged.

Further, since the innermost crimped portions 20a, 21a and 22a function as the indicators 20, 21 and 22, the volume of the tape 16 wrapped around the cassette reels 13, 13 can be checked through the transparent window 15 of the video cassette. Also, these crimped portions of the present invention are not designed awkwardly and can increase the commercial value of the video cassette.

While three indicators 20, 21 and 22 are formed on the upper flange 3 as described above, the number of the indicators is not limited to three but may be more than four.

According to the present invention, as set forth above, even when the cassette reels 13 are stacked up and transported for the assembly of the cassette reel, the transparent portion of the upper flange 3 of the cassette reel 13 can be protected from being damaged. In addition, since the innermost crimped portions 20a, 21a and 22a function as the indicators 20, 21 and 22, these crimped portions are not designed awkwardly and can therefore increase the commercial value of the video cassette.

It should be understood that the above description is presented by way of example on a single preferred embodiment of the invention and it will be apparent that many modifications and variations could be effected by one with ordinary skill in the art without departing from the spirit and scope of the novel concepts of the invention, so that the scope of the invention should be determined only by the appended claims.

We claim as our invention:

1. A cassette reel comprising:
   (a) a hub having an upper and a lower surface and an opening for receiving a hub drive shaft from the lower surface of the hub;
   (b) a lower flange integrally molded with said hub;
   (c) an upper flange formed of a transparent plate; and
   (d) a plurality of indicators for a tape volume, each of said indicators being formed of a plurality of crimped portions protruded upwardly on the outer surface of said upper flange in the diametrical direction thereof and spaced apart from each other by approximately equal annular distances, wherein the innermost crimped portions of said indicators are made higher than other crimped portions and are located to have a larger diameter than the periphery of said hub opening.

2. A cassette reel according to claim 1, in which the height of said innermost crimped portions from the outer surface of said upper flange is selected in a range of 0.1 mm to 0.5 mm.

3. A tape cassette reel according to claim 2, in which the height of other crimped portions form the outer surface of said upper flange is selected to be 20 micrometers.

4. A cassette reel according to claim 1, in which the number of said plurality of indicators is at least three.

5. A cassette reel according to claim 1, in which the number of said plurality of crimped portions in each of said indicators is seven.

* * * * *